(12) United States Patent
Lindgren et al.

(10) Patent No.: US 12,097,809 B2
(45) Date of Patent: Sep. 24, 2024

(54) INSULATING ELEMENT

(71) Applicant: SIKA TECHNOLOGY AG, Baar (CH)

(72) Inventors: Henrik Lindgren, Feluy (BE); Dimitri Marcq, Tubize (BE)

(73) Assignee: SIKA TECHNOLOGY AG, Baar (CH)

( * ) Notice: Subject to any disclaimer, the term of this patent is extended or adjusted under 35 U.S.C. 154(b) by 343 days.

(21) Appl. No.: 17/639,704

(22) PCT Filed: Jul. 10, 2020

(86) PCT No.: PCT/EP2020/069658
§ 371 (c)(1),
(2) Date: Mar. 2, 2022

(87) PCT Pub. No.: WO2021/069120
PCT Pub. Date: Apr. 15, 2021

(65) Prior Publication Data
US 2022/0289124 A1    Sep. 15, 2022

(30) Foreign Application Priority Data
Oct. 8, 2019   (EP) .................................... 19202038

(51) Int. Cl.
*B60R 13/08*   (2006.01)
*H01B 17/56*   (2006.01)

(52) U.S. Cl.
CPC .......... *B60R 13/08* (2013.01); *B60R 13/0815* (2013.01); *H01B 17/56* (2013.01); *B60R 2013/0807* (2013.01)

(58) Field of Classification Search
CPC .............. B60R 13/08; B60R 13/00807; B60R 13/0815; H01B 17/56; H01B 17/66; H01B 17/60; H01B 19/00
(Continued)

(56) References Cited

U.S. PATENT DOCUMENTS 5,266,133 A   11/1993   Hanley et al.
5,373,027 A   12/1994   Hanley et al.
(Continued)

FOREIGN PATENT DOCUMENTS

EP   0 204 970 A2   12/1986
EP   3 263 425 A1   1/2018
(Continued)

OTHER PUBLICATIONS

Text wo2012143305 (Year: 2012).*
(Continued)

*Primary Examiner* — Dennis H Pedder
(74) *Attorney, Agent, or Firm* — Oliff PLC (57) ABSTRACT

An insulating element for sealing off a structural element in a motor vehicle includes a carrier and an expandable material that is arranged on the carrier. The insulating element has a top side and a bottom side, wherein at least three contact points are arranged on each of the top side and the bottom side, which are designed in such a way that, when a plurality of identical insulating elements are stacked, adjacent insulating elements respectively lie on one another via these contact points and are thus arranged parallel to one another.

14 Claims, 4 Drawing Sheets

(58) Field of Classification Search
USPC .................................................... 296/187.02
See application file for complete search history.

(56) References Cited

U.S. PATENT DOCUMENTS

| | | | |
|---|---|---|---|
| 6,357,819 B1 * | 3/2002 | Yoshino ............... | B62D 29/002 |
| | | | 296/187.02 |
| 6,387,470 B1 | 5/2002 | Chang et al. | |
| 10,220,800 B2 * | 3/2019 | Brichet ................... | B60R 13/08 |
| 2010/0320028 A1 * | 12/2010 | Wojtowicki ............ | B60R 13/08 |
| | | | 181/264 |
| 2015/0315782 A1 | 11/2015 | Belpaire et al. | |

FOREIGN PATENT DOCUMENTS

| | | | |
|---|---|---|---|
| GB | 2463858 A | 3/2010 | |
| JP | 2006-1472 A | 1/2006 | |
| WO | 2005/080524 A1 | 9/2005 | |
| WO | WO-2012143305 A1 * | 10/2012 | ........... B62D 29/002 |

OTHER PUBLICATIONS

Apr. 12, 2022 International Preliminary Report on Patentability issued in International Patent Application No. PCT/EP2020/069658.

Premier Tech Systems and Automation, "Robot Palletizer—Robotic Modular Palletizer (RPM Series)", Sep. 10, 2015, https://www.youtube.com/watch?v=jHsRjke6fhl.

Oct. 6, 2020 Search Report issued in International Patent Application No. PCT/EP2020/069658.

* cited by examiner

INSULATING ELEMENT

The invention relates to an insulating element for sealing off a structural element in a motor vehicle. The invention furthermore relates to a system having a plurality of such insulating elements and to a method for attaching such insulating elements to structural elements.

In many cases, components, such as for example bodies and/or frames of transportation and conveyance means, in particular of aquatic or terrestrial vehicles or of aircraft, have structures with cavities in order to make lightweight constructions possible. However, these cavities cause a wide variety of problems. Depending on the type of the cavity, the latter has to be sealed in order to prevent the ingress of moisture and dirt, which can lead to the corrosion of the components. It is often also desirable to substantially reinforce the cavities, and thus the component, but to retain the low weight. It is often also necessary to stabilize the cavities, and thus the components, in order to reduce noises which would otherwise be transmitted along or through the cavity. Many of these cavities have an irregular shape or a narrow extent, making it more difficult to seal, reinforce and insulate them properly.

In particular in automotive construction, but also in aircraft construction and boat building, sealing elements (baffles) are therefore used in order to seal and/or acoustically insulate cavities, or reinforcing elements (reinforcers) are used in order to reinforce cavities.

Figure 1:
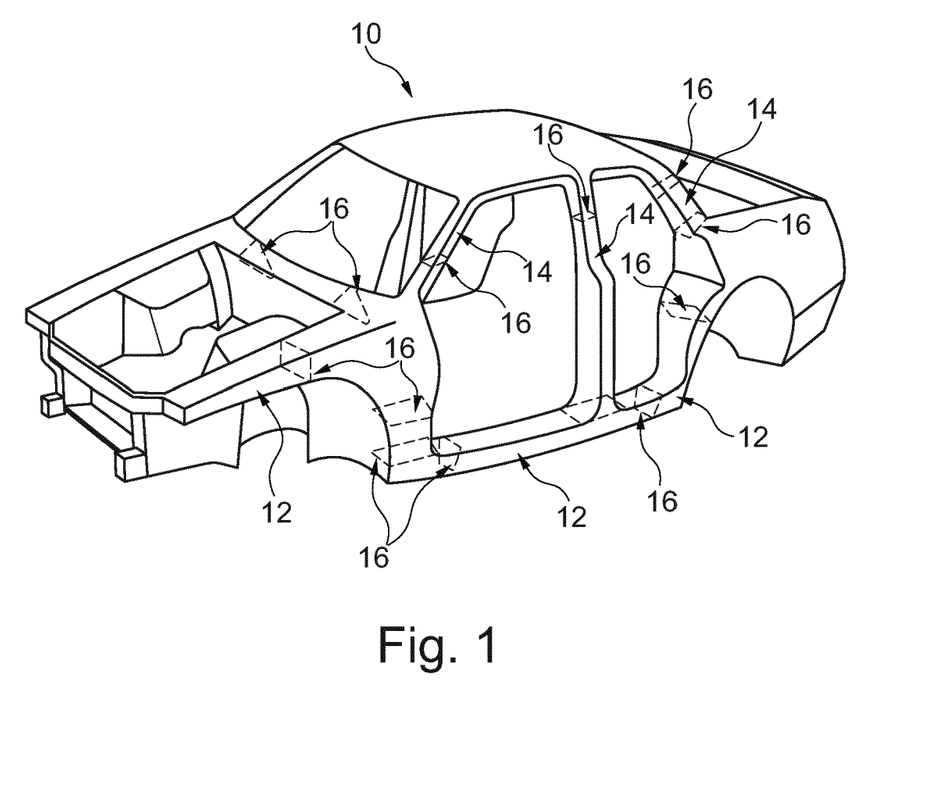
FIG. 1 shows an exemplary illustration of a vehicle body.

FIG. 1 schematically illustrates a body of an automobile. Here, the vehicle body 10 has various structures with cavities, such as for example pillars 14 and carriers or braces 12. Such structural elements 12, 14 with cavities are usually sealed or reinforced with insulating elements 16.

A disadvantage of the previously known sealing and/or reinforcing elements is that such parts often cannot be packed efficiently. Furthermore, when such parts are being transported, individual parts are repeatedly mixed up and damaged.

It is therefore an object of the present invention to provide an improved insulating element for sealing off a structural element in a motor vehicle, which avoids the disadvantages of the prior art. In particular, the insulating element should be able to be packed and transported more economically.

This object is achieved by an insulating element for sealing off a structural element in a motor vehicle, the insulating element comprising: a carrier; and an expandable material that is arranged on the carrier; wherein the insulating element has a top side and a bottom side which, in a state of use, are substantially aligned in a plane of a cross section to be sealed off, wherein the insulating element has at least three contact points on each of the top side and the bottom side, wherein these contact points are designed in such a way that, when a plurality of identical insulating elements are stacked, adjacent insulating elements respectively lie on one another via these contact points and are thus arranged parallel to one another.

Firstly, this solution has the advantage that it provides an insulating element which is designed to be stackable. As a result, such insulating elements can be stacked on top of one another for transport and packed and transported in the stacked state. On the one hand, this saves on transport costs because it allows the insulating elements to be packed in a more space-saving manner, with the result that in a given volume more insulating elements can be transported than was the case with conventional insulating elements. In addition, stacking such insulating elements offers the advantage that mixups between different insulating elements can be identified more easily. If, for example, a first insulating element is packed in a container with a plurality of second insulating elements, this is immediately noticeable because the first insulating element generally cannot be stacked with the second insulating elements. This makes it possible to greatly reduce mixups.

The stackable insulating element proposed here furthermore offers the advantage that the individual insulating elements cannot be damaged as easily owing to the stacked arrangement for transport and storage. Specifically, if the individual insulating elements are transported loosely in a container as before, the insulating elements will come into contact with one another many times, and damage can occur from time to time. However, if the insulating elements are transported in stacks, the number of times the insulating elements make mechanical contact with one another is greatly reduced. In addition, the insulating elements may be configured in such a way that the intended locations of contact have a robust form and/or one that is less prone to damage, and/or that locations of the insulating elements that are easier to damage are arranged at protected points which, for example, are covered by the adjacent insulating elements when stacked.

Furthermore, the stackable insulating element proposed here offers the advantage that automated attachment of the insulating elements to structural elements in motor vehicles is facilitated. For example, entire stacks of such insulating elements can be loaded into a robot, which then removes the individual insulating elements from this stack and correspondingly attaches them to the structural elements. In the case of loosely arranged insulating elements in a container, such an automated attachment of the insulating elements is significantly more difficult to accomplish.

In the context of this invention, the term "insulating element" comprises elements for closing off and/or sealing off and/or closing and/or reinforcing and/or insulating a structural element. This variety of characteristics of such an insulating element can in this case arise individually or else in combination with one another.

In the context of this invention, the terms "top side" and "bottom side" mean the two main surfaces or the two largest side surfaces of the insulating element. Since the insulating elements are designed to close a cross section in a structural element, this means that the top side and the bottom side are each substantially in a plane of a cross section to be sealed off in a state of use. In this respect, the top side and/or the bottom side may also have a step-shaped character, that is to say it is not necessary for the top side and/or the bottom side to have a completely flat form.

In the context of this invention, the term "parallel" in relation to the arrangement of insulating elements in a stack of a plurality of identical insulating elements means that the same surfaces and/or edges of the identical insulating elements are respectively arranged substantially parallel to one another.

In one exemplary embodiment, the insulating element has exactly three contact points on each of the top side and the bottom side, which contact points lie on one another when adjacent insulating elements are stacked.

In an alternative refinement, the insulating element has exactly four or at least four such contact points on the top side and on the bottom side.

In a further alternative embodiment, the insulating element has exactly five or at least five such contact points on the top side and on the bottom side.

In one exemplary embodiment, at least one contact point on the top side and an assigned contact point on the bottom side are formed in such a way that adjacent insulating elements are secured against horizontal displacement when stacking occurs in the vertical direction.

In one exemplary refinement, at least one contact point on the top side and an assigned contact point on the bottom side are formed in such a way that there is a mechanical locking between the corresponding contact points when stacking occurs.

In one exemplary embodiment, a contact point on the top side is in the form of a first coupling element and an assigned contact point on the bottom side is in the form of a second coupling element, wherein, when stacking occurs, the first coupling element and the second coupling element interlock in such a way that the adjacent insulating elements are temporarily fixed as a result.

In one exemplary embodiment, at least one contact point lies in a region of a fixing element.

In the context of this invention, the "region of a fixing element" is understood to mean the fixing element itself, a base of the fixing element, and the expandable material at the base of the fixing element that is required to seal off the opening in the structural element in which the fixing element is inserted.

In one exemplary embodiment, the fixing element is in the form of a clip.

In one exemplary embodiment, a height of the fixing element in a stacking direction is less than 8 mm, preferably less than 7 mm, particularly preferably less than 6 mm.

In one exemplary embodiment, a height at the base of the fixing element in the stacking direction that includes both a base of the fixing element and the expandable material at the base of the fixing element that is required to seal off the opening in the structural element in which the fixing element is inserted is at most 130% or at most 120% or at most 110% of a height of the fixing element in the stacking direction.

The advantage of the configuration of such relative heights is that it allows the insulating elements to be packed in a more space-saving manner.

In one exemplary embodiment, at least one contact point is in the form of a spacer element, wherein the spacer element serves to support and/or position the insulating element on the structural element in a state of use of the insulating element in the structural element.

In one exemplary refinement, the spacer element is configured to be stackable per se, wherein two spacer elements stacked one inside the other have a total height in the stacking direction of at most 170% or at most 160% or at most 150% or at most 140% or at most 130% of a height of an individual spacer element.

In one exemplary embodiment, steps of the carrier form an angle to the stacking direction of at least 35° or at least 40° or at least 45° or at least 50° or at least 55°.

The advantage of steps configured in this way is that insulating elements with flatter steps can be stacked more readily than would be the case with steeper steps. In the case of steeper steps, there is the problem in particular that adjacent insulating elements cannot be arranged vertically one above another without a horizontal offset.

In one exemplary embodiment, at least one contact point is in the form of a support element which protrudes from a general surface of the top side or the bottom side of the insulating element in the stacking direction.

In one exemplary embodiment, all of the contact points or individual contact points are formed by the carrier.

In an alternative embodiment, all of the contact points or individual contact points are formed by the expandable material.

In a further embodiment, at least one contact point is formed by the carrier, and at least one contact point is formed by the expandable material.

Since the carrier can generally be produced with smaller tolerances than the expandable material, it may be advantageous for the carrier to form the contact points as far as possible.

In one exemplary embodiment, the insulating element has at least one securing element, which is formed in such a way that, when insulating elements are stacked on top of one another, an insulating element is secured by the securing element of an adjacent insulating element against displacement transversely to the stacking direction and/or against rotation of the insulating element about the stacking direction.

In one exemplary embodiment, the securing element is formed in such a way that, when insulating elements are stacked on top of one another, the securing elements of two adjacent insulating elements overlap in the stacking direction.

In one exemplary refinement, the securing elements overlap in the stacking direction by at least 3 mm or by at least 5 mm or by at least 7 mm.

In one exemplary embodiment, the securing element has at least one guide surface, which is formed such that, when stacking occurs, the guide surface guides an insulating element to be stacked, with the result that the newly stacked insulating element is arranged on the insulating element substantially congruently in the stacking direction.

In one exemplary embodiment, at least one spacer element is configured as a securing element.

In one exemplary refinement, the spacer element has a substantially Y-shaped configuration. For example, in this case individual surfaces of the legs of the Y-shaped spacer element may be in the form of a guide surface.

In an alternative refinement, the spacer element is substantially U-shaped or V-shaped. In turn, in this case individual surfaces of the legs of the U-shaped or V-shaped spacer element may be in the form of a guide surface.

In one exemplary embodiment, at least one step is configured as a securing element.

In one exemplary embodiment, at least one region of a fixing element is configured as a securing element.

In one exemplary refinement, a base of the fixing element is configured as a securing element. This base may, for example, have a substantially U-shaped form. In turn, in this case individual surfaces of the legs of the U-shaped base of the fixing element may be in the form of guide surfaces.

In one exemplary embodiment, all of the securing elements or individual securing elements are formed by the carrier.

In an alternative embodiment, all of the securing elements or individual securing elements are formed by the expandable material.

In a further embodiment, at least one securing element is formed by the carrier, and at least one securing element is formed by the expandable material.

Since the carrier can generally be produced with smaller tolerances than the expandable material, it may be advantageous for the carrier to form the securing elements as far as possible.

In principle, various materials which can be made to foam can be used as the expandable material. In this respect, it is possible that the material has or does not have reinforcing properties. Typically, the expandable material is caused to expand thermally, by moisture or by electromagnetic radiation.

Such an expandable material typically has a chemical or a physical foaming agent. Chemical foaming agents are organic or inorganic compounds which decompose under the influence of temperature, moisture or electromagnetic radiation, wherein at least one of the decomposition products is a gas. Compounds which transition into the gaseous aggregate state when the temperature is increased may for example be used as physical foaming agents. As a result, both chemical and physical foaming agents are capable of creating foam structures in polymers.

The expandable material is preferably foamed thermally, with chemical foaming agents being used. Examples of suitable chemical foaming agents are azodicarbonamides, sulfohydrazides, hydrogen carbonates or carbonates.

Suitable foaming agents are, for example, also commercially available under the trade name Expancel® from Akzo Nobel, the Netherlands, or under the trade name Celogen® from Chemtura Corp., USA.

The heat required for the foaming can be introduced by external or by internal heat sources, such as an exothermic chemical reaction. The foamable material is preferably foamable at a temperature of <250° C., in particular from 100° C. to 250° C., preferably from 120° C. to 240° C., preferably from 130° C. to 230° C.

Suitable expandable materials are, for example, one-component epoxy resin systems which do not flow at room temperature and in particular have increased impact resistance and contain thixotropic agents such as aerosils or nanoclays. For example, epoxy resin systems of this type include 20 to 50% by weight of a liquid epoxy resin, 0 to 30% by weight of a solid epoxy resin, 5 to 30% by weight of impact modifiers, 1 to 5% by weight of physical or chemical foaming agents, 10 to 40% by weight of fillers, 1 to 10% by weight of thixotropic agents and 2 to 10% by weight of heat-activatable catalysts. Suitable impact modifiers are reactive liquid rubbers based on nitrile rubber or derivatives of polyether polyol polyurethanes, core-shell polymers and similar systems known to a person skilled in the art.

Likewise suitable expandable materials are one-component polyurethane compositions containing foaming agents and based on crystalline polyesters which comprise OH groups and have been mixed with further polyols, preferably polyether polyols, and polyisocyanates with blocked isocyanate groups. The melting point of the crystalline polyester should be >50° C. The isocyanate groups of the polyisocyanate can be blocked for example by nucleophiles such as caprolactam, phenols or benzoxalones. Also suitable are blocked polyisocyanates such as are used, for example, in powder-coating technology and are commercially available, for example, under the trade names Vestagon® BF 1350 and Vestagon® BF 1540 from Degussa GmbH, Germany. Also as isocyanates are so-called encapsulated or surface-deactivated polyisocyanates which are known to a person skilled in the art and are described, for example, in EP 0 204 970.

Also suitable as expandable materials are two-component epoxy/polyurethane compositions which contain foaming agents, such as are described, for example, in WO 2005/080524 A1.

Also suitable as expandable materials are ethylene-vinyl acetate compositions containing foaming agents.

Expandable materials that are likewise suitable are marketed by Sika Corp., USA, for example under the trade name SikaBaffle® 240, SikaBaffle® 250 or SikaBaffle® 255, and are described in U.S. Pat. Nos. 5,266,133 and 5,373,027. Such expandable materials are particularly preferred for the present invention.

For example, preferred expandable materials having reinforcing properties are those marketed by Sika Corp., USA under the trade name SikaReinforcer® 941. These are described in U.S. Pat. No. 6,387,470.

In one exemplary embodiment, the expandable material has an expansion rate of from 800% to 5000%, preferably from 1000% to 4000%, particularly preferably from 1500% to 3000%. Expandable materials with such expansion rates offer the advantage that the structural element can be reliably sealed or sealed off with respect to liquids and noise as a result.

In one exemplary embodiment, the expandable material is in the form of a temperature-stimulated material.

This has the advantage that, as a result, the furnace for baking the dip coating liquid can be used to expand the expandable material and to thus seal off the cavity. Consequently, an additional work step is not necessary.

The carrier may consist of any desired materials. Preferred materials are plastics, in particular polyurethanes, polyamides, polyesters and polyolefins, preferably polymers which can withstand high temperatures such as poly(phenylene ethers), polysulfones or polyether sulfones, which in particular are also foamed; metals, in particular aluminum and steel; or grown organic materials, in particular wood materials or other (densified) fibrous materials, or glass-type or ceramic materials; especially also foamed materials of this type; or any desired combinations of these materials. Polyamide, in particular polyamide 6, polyamide 6.6, polyamide 11, polyamide 12, or a mixture thereof, is particularly preferably used.

Furthermore, the carrier may be solid, hollow or foamed or have a grid-like structure, for example. Typically, the surface of the carrier can be smooth, rough or structured.

In the case of insulating elements in which the expandable material is located on a carrier, the production process differs according to whether the carrier consists or does not consist of a material that can be processed by injection molding. If this is the case, a two-component injection molding process is usually used. Here, first of all a first component, in this case the carrier, is injected. After said first component has solidified, the cavity in the mold is enlarged, or adapted, or the molding produced is placed into a new mold, and a second component, in this case the expandable material, is overmolded onto the first component by a second injection apparatus.

If the carrier consists of a material that cannot be produced by the injection molding process, that is to say for example consists of a metal, the carrier is placed into a corresponding mold and the expandable material is overmolded onto the carrier. Of course, it is also possible to fasten the expandable material to the carrier by specific fastening means or processes.

Furthermore, carriers can also be produced by other processes, for example by extrusion.

The insulating element has a stack height which corresponds to an additional height in the stacking direction of a stack having insulating elements by which the stack grows when a further insulating element is stacked onto the stack.

In one exemplary embodiment, a stack height of the insulating element is at most 80%, preferably at most 70%, preferably at most 60%, preferably at most 50%, preferably at most 40%, preferably at most 30%, of a total height of an individual insulating element in the stacking direction.

This has the advantage that it allows the insulating elements to be arranged in a stack in a more space-saving manner. A stronger vertical nesting of adjacent insulating elements in a stack moreover improves the stability of the overall stack.

The object set out in the introduction is moreover achieved by a system having a plurality of such insulating elements, wherein the insulating elements are stacked on top of one another.

In one exemplary embodiment, the system comprises at least 10 or at least 15 or at least 20 or at least 25 or at least 30 stacked insulating elements.

In a further exemplary embodiment, the system comprises at most 150 or at most 120 or at most 100 or at most 80 or at most 60 stacked insulating elements.

In one exemplary embodiment, a lowermost insulating element of the stack lies on a base element.

The provision of such a base element has the advantage that it allows a stack of insulating elements to be placed on a surface. Moreover, such base elements can be used for an automated process.

In one exemplary embodiment, each additional insulating element increases the height of the stack by at most 20 mm, particularly preferably by at most 18 mm, particularly preferably by at most 16 mm, particularly preferably by at most 14 mm, particularly preferably by at most 12 mm, particularly preferably by at most 10 mm.

The tight stacking of insulating elements has the advantage that it allows the insulating elements to be packed more efficiently.

In one exemplary embodiment, a stack height of an individual insulating element is at most 80%, preferably at most 70%, preferably at most 60%, preferably at most 50%, preferably at most 40%, preferably at most 30%, of a total height of an individual insulating element in the stacking direction.

The tight stacking of insulating elements in turn has the advantage that it allows the insulating elements to be packed more efficiently.

The object set out in the introduction is moreover achieved by a method for attaching insulating elements to structural elements in motor vehicles, the method comprising the steps of: providing a system having stacked insulating elements as described above; loading the system into an application robot; removing an individual insulating element from the system; transporting the individual insulating element by way of a robot arm; and attaching the insulating element to the structural element of the motor vehicle.

In one exemplary embodiment, the application robot is loaded with a plurality of systems at the same time.

In one exemplary embodiment, the individual insulating elements are removed by the robot arm.

Details and advantages of the invention will be described below on the basis of exemplary embodiments and with reference to schematic drawings. In the drawings.

Figure 2A:
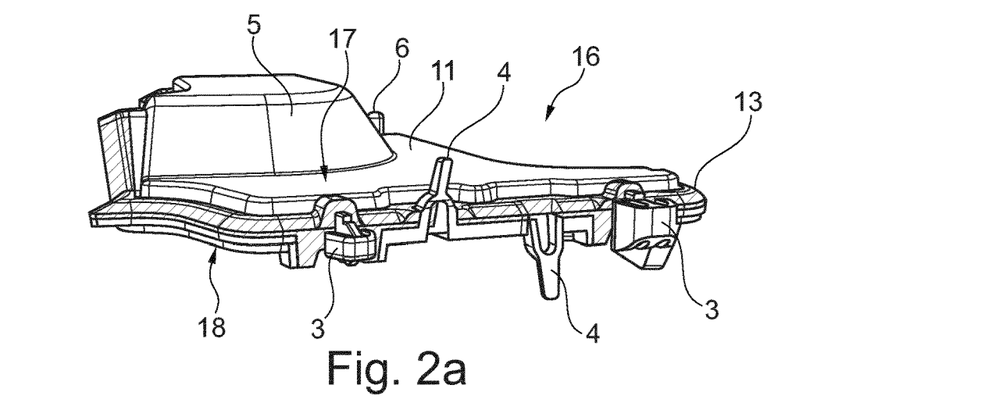
FIGS. 2a to 2c show a schematic illustration of an exemplary insulating element and/or a system having a plurality of such insulating elements.

Firstly, FIG. 2a illustrates an individual insulating element 16. This insulating element 16 has a carrier 11 and an expandable material 13 arranged on this carrier 11. The insulating element 16 has a substantially flat form in order to be able to efficiently seal off a cross section of a structural element in a state of use. In this case, however, the insulating element 16 does not have a completely flat form, but rather has various elevations and step-shaped shoulders, in particular one steep step 5.

The insulating element 16 has a top side 17 and a bottom side 18 here. Moreover, the insulating element 16 in this exemplary embodiment has two fixing elements 3, which are each in the form of a clip, and two spacer elements 4, which are each aligned on different sides.

Moreover, the insulating element 16 has a support element 6 which in this exemplary embodiment is arranged on the top side 17 of the insulating element 16.

In this exemplary embodiment, the insulating element 16 has three contact points arranged on the top side 17, and three respective assigned contact points on the bottom side 18. Here, two respective contact points are arranged in the regions of the fixing elements 3, and a further contact point is in the form of a support element 6 or a support point on the bottom side 18 of the insulating element 16.

Figure 2B:
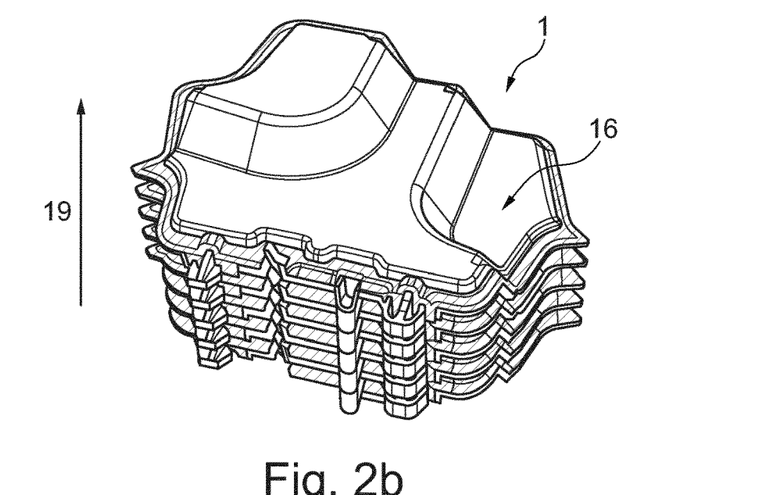

FIG. 2b now illustrates a system 1 having a plurality of insulating elements 16 according to FIG. 2a. The insulating elements 16 are stacked on top of one another in a stacking direction 19 here. In this case, the stacked insulating elements 16 are arranged parallel to one another and in each case lie on one another at the contact points on their top side and bottom side.

Figure 2C:
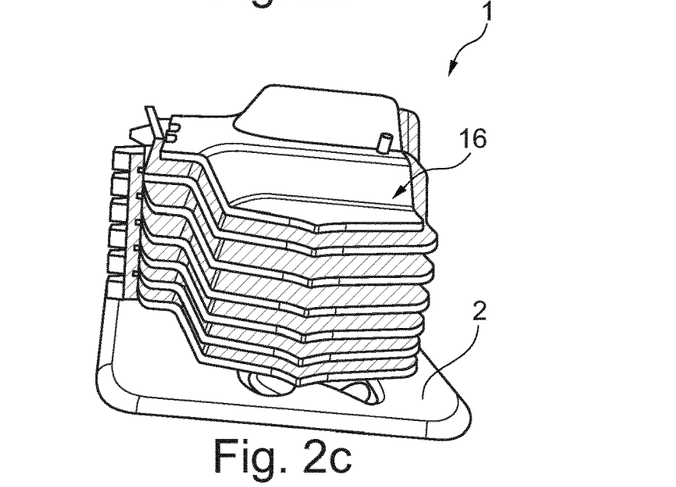

FIG. 2c in turn illustrates a stack and/or a system 1 having stacked insulating elements 16, the lowermost insulating element 16 of the stack being fixed on a base element 2 in this exemplary embodiment.

Figure 3:
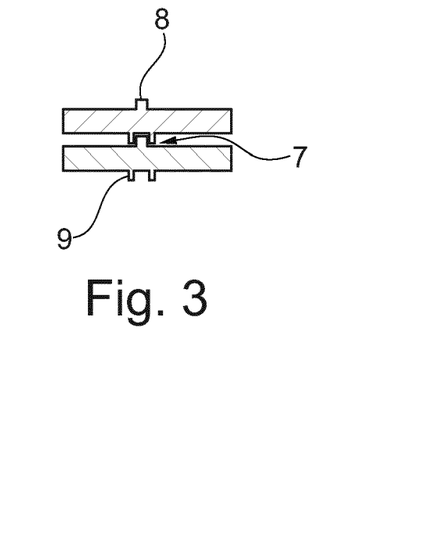
FIG. 3 shows a schematic illustration of an exemplary temporary fixing between two adjacent insulating elements.

FIG. 3 schematically illustrates an exemplary mechanical locking 7 between two adjacent insulating elements. In this case, a first coupling element 8 of a lower insulating element engages into a second coupling element 9 of an upper insulating element. This makes it possible, for example, to secure the stacked insulating elements against horizontal displacement and partially also against displacement in other directions.

Figure 4:
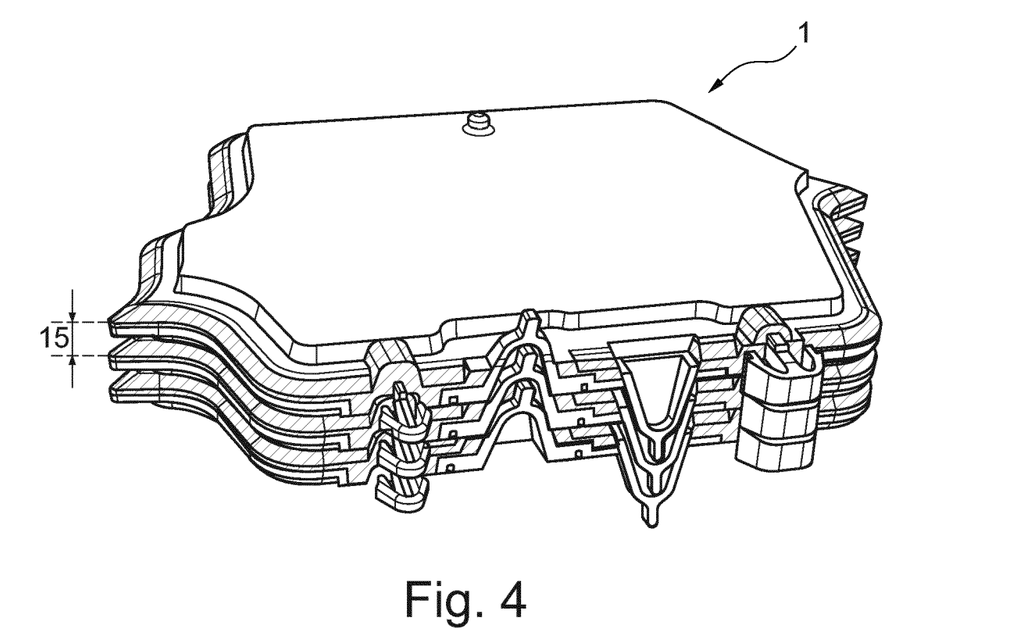
FIG. 4 shows a schematic illustration of an exemplary system having a plurality of stacked insulating elements.

FIG. 4 illustrates a further exemplary system 1 having stacked insulating elements 16. In this illustration it can be seen that each additional insulating element 16 increases the height of the stack by a respective stack height 15 of an insulating element 16.

Figure 5:
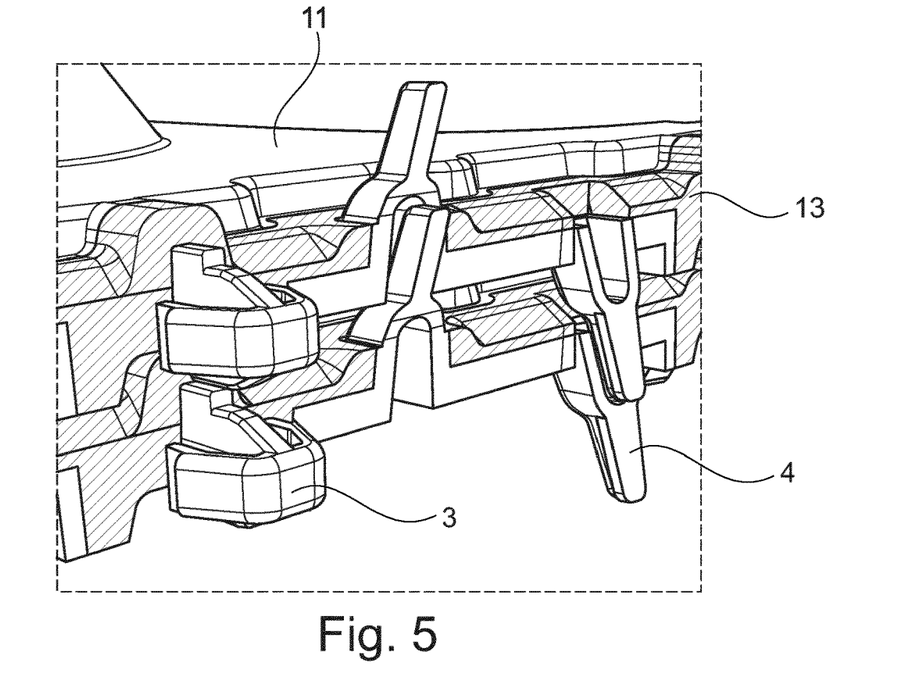
FIG. 5 shows an illustration of detail of two stacked exemplary insulating elements.

FIG. 5 illustrates a detail of two stacked exemplary insulating elements. In this embodiment, a region of the fixing element 3, specifically the expandable material 13 which is arranged around a base of the fixing element 3, forms a contact point. The fixing elements 3, arranged one above the other, do not touch one another here. This detail furthermore shows two spacer elements 4 per insulating element 16. In this exemplary embodiment, the spacer elements 4 are each in the form of a securing element, since they prevent the insulating element from being displaced transversely to the stacking direction and from rotating about the stacking direction. The spacer elements 4 have a substantially Y-shaped configuration, each of the legs forming guide surfaces as a positioning aid during the stacking. Moreover, the spacer elements 4 of adjacent insulating elements overlap in the stacking direction.

Figure 6:
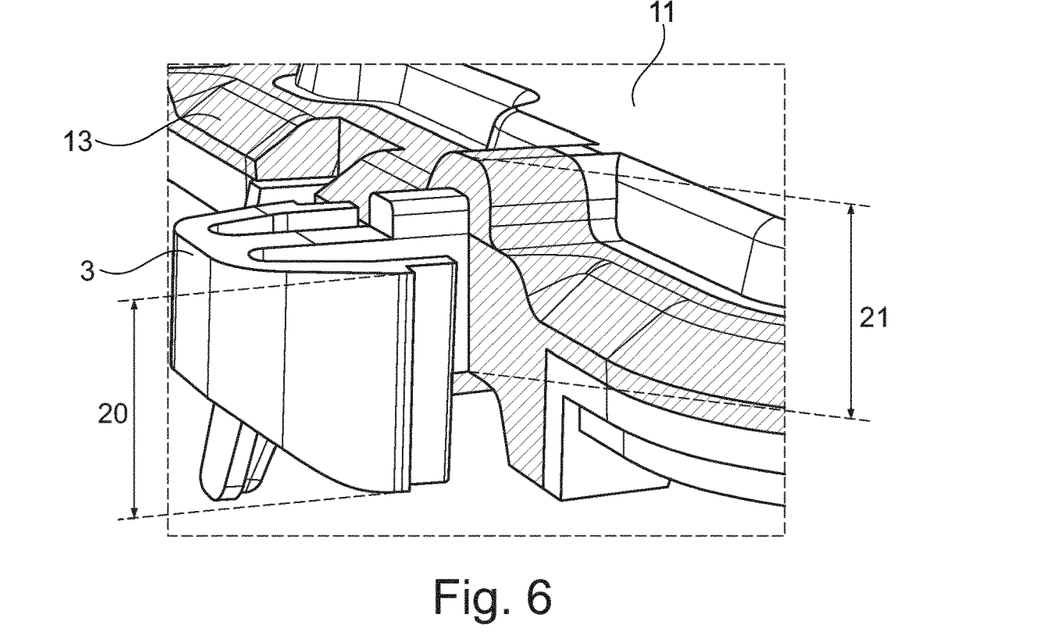
FIG. 6 shows an illustration of detail of an exemplary insulating element.

Finally, FIG. 6 illustrates a detail of an exemplary insulating element 16. Here, in particular, a region of a fixing element 3 can be seen. The region of the fixing element 3 comprises both the fixing element 3 itself, which is in the form of a clip, and a base of the fixing element 3 and expandable material 13 which is arranged on the base of the fixing element 3 and is required to seal off an opening in the structural element in which the fixing element 3 can be inserted.

In this exemplary embodiment, a height 21 at the base of the fixing element 3 is marked. This height 21 at the base includes both a base of the fixing element and the expandable material at the base of the fixing element that is required to seal off the opening in the structural element in which the fixing element is inserted. Furthermore, a height 20 of the fixing element 3 itself is marked.

LIST OF REFERENCE SIGNS

1 System
2 Base element
3 Fixing element
4 Spacer element
5 Step
6 Support element
7 Mechanical locking
8 First coupling element
9 Second coupling element
10 Vehicle body
11 Carrier
12 Structural element
13 Expandable material
14 Structural element
15 Stack height of an insulating element
16 Insulating element
17 Top side
18 Bottom side
19 Stacking direction
20 Height of the fixing element
21 Height of the base of the fixing element

The invention claimed is:

1. An insulating element for sealing off a structural element in a motor vehicle, the insulating element comprising:
   a carrier; and
   an expandable material that is arranged on the carrier; wherein
   the insulating element has a top side and a bottom side which, in a state of use, are substantially aligned in a plane of a cross section of the structural element that is to be sealed off,
   the insulating element has at least three contact points on each of the top side and the bottom side, wherein the contact points are designed in such a way that, when a plurality of the insulating elements are stacked, adjacent ones of the insulating elements respectively lie on one another via the contact points and are parallel to one another, and
   the insulating element has at least one securing element which is formed in such a way that, when the insulating elements are stacked on top of one another, the insulating element is secured by the securing element of an adjacent one of the insulating elements against displacement transversely to the stacking direction and/or against rotation of the insulating element about the stacking direction.

2. The insulating element as claimed in claim 1, wherein at least one spacer element and/or at least one step and/or at least one region of a fixing element is configured as the securing element.

3. The insulating element as claimed in claim 1, wherein at least one contact point lies in a region of a fixing element, and/or wherein the region of the fixing element is in the form of the securing element.

4. The insulating element as claimed in claim 2, wherein a height at the base of the fixing element in the stacking direction that includes both a base of the fixing element and expandable material at the base of the fixing element that is required to seal off an opening in the structural element in which the fixing element can be inserted is at most 130% of a height of the fixing element in the stacking direction.

5. The insulating element as claimed in claim 1, wherein the at least one securing element is a spacer element, and the spacer element serves to support the insulating element on the structural element in a state of use of the insulating element in the structural element.

6. The insulating element as claimed in claim 5, wherein the spacer element is configured to be stackable, and two of the spacer elements stacked one inside the other have a total height in the stacking direction of at most 170% of the spacer element individually.

7. The insulating element as claimed in claim 1, wherein steps of the insulating element form an angle to the stacking direction of at least 35°.

8. The insulating element as claimed in claim 1, wherein at least one contact point is a support element which protrudes from a general surface of the top side or the bottom side of the insulating element in the stacking direction.

9. A system having a plurality of the insulating elements as claimed in claim 1, wherein the insulating elements are stacked on top of one another.

10. The system as claimed in claim 9, wherein the system comprises at least 10 of the insulating elements stacked, and/or a lowermost insulating element of the system lies on a base element.

11. The system as claimed in claim 9, wherein each additional insulating element increases the height of the stack in the stacking direction by at most 20 mm.

12. The system as claimed in claim 9, wherein a stack height of the insulating element is at most 50% of a total height of the insulating element in the stacking direction.

13. A method for attaching insulating elements to structural elements in motor vehicles, the method comprising:
   providing the system as claimed in claim 9;
   loading the system into an application robot;
   removing an individual one of the insulating elements from the system;
   transporting the individual one of the insulating elements by way of a robot arm; and
   attaching the individual one of the insulating elements to the structural element of the motor vehicle.

14. The method as claimed in claim 13, wherein the application robot is loaded with a plurality of the systems at the same time and/or the individual insulating elements are removed by the robot arm.

* * * * *